United States Patent
Rimboeck et al.

(10) Patent No.: US 12,110,232 B2
(45) Date of Patent: Oct. 8, 2024

(54) METHOD FOR PRODUCING TECHNICAL SILICON

(71) Applicant: WACKER CHEMIE AG, Munich (DE)

(72) Inventors: Karl-Heinz Rimboeck, Heldenstein (DE); Konrad Mautner, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 400 days.

(21) Appl. No.: 17/598,412

(22) PCT Filed: Mar. 27, 2019

(86) PCT No.: PCT/EP2019/057772
§ 371 (c)(1),
(2) Date: Sep. 27, 2021

(87) PCT Pub. No.: WO2020/192913
PCT Pub. Date: Oct. 1, 2020

(65) Prior Publication Data
US 2022/0162078 A1    May 26, 2022

(51) Int. Cl.
*C01B 33/037* (2006.01)
(52) U.S. Cl.
CPC .................. *C01B 33/037* (2013.01)
(58) Field of Classification Search
CPC ....... C01B 33/037; C01B 33/00; C01B 33/02; C01B 33/025; C01P 2006/80; C01P 2004/51; C01P 2004/60; Y10T 428/2982
See application file for complete search history.

(56) References Cited

U.S. PATENT DOCUMENTS 5,788,945 A    8/1998    Schei

FOREIGN PATENT DOCUMENTS

CN    109052407 A  *  12/2018
EP    0699625 A1    3/1996

OTHER PUBLICATIONS

Machine translation of CN109052407A (Year: 2018).*
ScienceDirect, Silica Sand (Year: 2021).*
B. G. Gribov et al., Preparation of High-Purity Silicon for Solar Cells, Inorganic Materials, 2003, vol. 39. No. 7, pp. 653-662.
Aleksandar M. Mitrasinovic et al., "Impurity Removal and Overall Rate Constant During Low Pressure Treatment of Liquid Silicon", Journal of Materials Processing Technology, Jan. 2012, vol. 212, No. 1, pp. 78-82.

* cited by examiner

*Primary Examiner* — Samir Shah
*Assistant Examiner* — Logan Edward Laclair
(74) *Attorney, Agent, or Firm* — BROOKS KUSHMAN P.C.

(57) ABSTRACT

Technical silicon is produced by heating a raw material mixture comprising particulate silicon metal-containing material and a particulate mediator containing at least one of C, O, Al, Ca and Si, to at least 1490° C., forming a liquid silicon phase, and solidifying this phase, wherein the raw material mixture a characteristic number K of from 0.000 to 60, calculated as follows:

$$K = \frac{m(SiM) \cdot d50(SiM) + m(Med) \cdot d50(Med)}{m(SiM) + m(Med)} \cdot \varphi \quad \text{(equation 1)}$$

where
m (SiM) is the mass of the silicon metal-containing material in the batch
m(Med) is the mass of the mediator
$d_{50,SiM}$ is the mean particle size of the silicon metal-containing material,
$d_{50,Med}$ is the mean particle size of the mediator, and
$\varphi$ is the mean porosity of the silicon metal-containing material.+

17 Claims, No Drawings

METHOD FOR PRODUCING TECHNICAL SILICON

CROSS REFERENCE TO RELATED APPLICATIONS

This application is the U.S. National Phase of PCT Appln. No. PCT/EP2019/057772 filed Mar. 27, 2019, the disclosure of which is incorporated in its entirety by reference herein.

BACKGROUND OF THE INVENTION

1. Field of the Invention

The invention relates to a method for producing technical silicon from a particulate raw material mixture comprising silicon metal-containing material and a particulate mediator by heating, with formation of a liquid silicon metal phase.

2. Description of the Related Art

Silicon in the technical grade (Si content <99.9% by mass, also referred to as technical silicon) is nowadays employed especially in silicothermic processes, in metal recovery and as a deoxidant in steelmaking and serves as an alloy constituent of casting alloys of aluminum, copper, titanium and iron and also as a starting material for chemical compounds.

The silicon-producing and/or silicon-processing industries generate large volumes of silicon-containing wastes and/or byproducts, which to the producer in question are associated with sometimes high costs for conveying or disposing. This entails the loss of considerable volumes of metallic silicon.

CN109052407A specifies a multistage method which first processes silicon waste and converts this processed silicon waste, by addition of a slag former and by subsequent remelting under reduced pressure, into higher-purity silicon. Disadvantages of this process are the use of halogen-containing fluxes and also the need to have to carry out targeted production of a slag-forming component mixture with defined mixing ratios of the individual components before deployment in the process described. The production of this mixture represents an additional cost and complexity. Under the operating conditions, halogen-containing fluxes can release volatile halogen compounds, entailing a series of disadvantages and potential hazards (e.g., corrosion of plant components, environmental damage, and damage to health) and hence an additional technical cost and complexity for managing these effects. Technical solutions of this kind are detrimental to the economics of the process.

The object of the present invention is to provide an economic method which allows the production of technical-grade silicon (<99.9% by mass of Si) starting from silicon-containing wastes and/or byproducts, and to overcome the disadvantages of the process of CN109052407A.

SUMMARY OF THE INVENTION

The invention is directed to a method for producing technical silicon,
wherein a particulate raw material mixture comprising particulate silicon metal-containing material and comprising a particulate mediator which comprises at least one of the elements C, O, Al, Ca and Si,
is heated to at least 1490° C., with formation of a liquid silicon metal phase,
and the liquid silicon metal phase is brought to solidification,
the particulate raw material mixture being described by a characteristic number K, K having a value of 0.000 to 60 and being calculated as follows:

$$K = \frac{m(SiM) \cdot d50(SiM) + m(Med) \cdot d50(Med)}{m(SiM) + m(Med)} \cdot \varphi \quad \text{(equation 1)}$$

where
m (SiM) mass of the silicon metal-containing material in the batch
m(Med) mass of the mediator in the raw material mixture
$d_{50,SiM}$ particle size (diameter) at 50% of the mass undersize of the grading curve of the silicon metal-containing material,
$d_{50,Med}$ particle size (diameter) at 50% of the mass undersize of the grading curve of the mediator,
$\varphi$ the mean porosity of the silicon metal-containing material.

DETAILED DESCRIPTION OF THE PREFERRED EMBODIMENTS

The recovery of the silicon metal fraction from the silicon metal-containing materials makes a contribution to more economic and more sustained production of technical silicon.

The greatest advantage of the method of the invention, in comparison to known processes, lies in the possibility of recycling the metallic silicon fractions of silicon metal-containing materials without adding chemicals. This provides an ecological and economic advantage. For the focus on the circular economy, a high fraction of this raw material would no longer be available for further utilization if the silicon were not recovered. As a result of the method, therefore, there is better utilization of the technologically relevant silicon.

The technical silicon produced preferably has an Si content of at least 90% by mass, more preferably at least 95% by mass, and most preferably at least 97% by mass.

The characteristic number K preferably has a value of 0.01 to 40, more preferably 0.01 to 30, most preferably of 0.03 to 10.

The constituents of the particulate raw material mixture may be placed into the furnace together or separately from one another. The addition may be made here manually or automatically. The particulate raw material mixture is converted under the operating conditions into a mixture referred to as the furnace charge. In the furnace charge, as a result of heating, metallic silicon in liquid form is formed, and forms a silicon metal phase.

In accordance with the invention the particulate raw material mixture has the following characteristics:
the particulate raw material mixture is preferably used as a particle mixture, where preferably
the particles of the silicon metal-containing material have a mean particle size $d_{50,SiM}$ of preferably 0.1 to 100 mm, more preferably 0.5 to 75 mm, yet more preferably 1 to 50 mm, and most preferably of 5 to 30 mm;
the particles of the silicon metal-containing material preferably have a mean particle porosity of 0 to 0.6, more preferably of 0.05 to 0.4, yet more preferably of 0.1 to 0.35, and most preferably of 0.15 to 0.3;

the particles of the mediator preferably have a mean particle size $d_{50,Med}$ of 0.1 to 100 mm, more preferably of 1 to 75 mm, yet more preferably 2 to 50 mm, and most preferably 5 to 30 mm;

the mass ratio m (silicon metal-containing material)/m (mediator) preferably adopts values of 0.1 to 10, more preferably 0.2 to 8, yet more preferably 0.4 to 6, and most preferably 0.5 to 5.

The silicon metal-containing material in the dry state preferably contains at least 20% by mass, more preferably at least 30% by mass, yet more preferably at least 40% by mass, and most preferably at least 45% by mass of metallic silicon.

The silicon metal-containing material preferably comprises silicon residues which are preferably selected from byproducts or wastes of the silicon-producing or silicon-processing industries, examples being those arising in the production or the mechanical processing of silicon, such as poly-, multi- or monocrystalline silicon;

those arising in the production of granulated silicon metal in, for example, fluidized bed, centrifugal, gas atomization or water granulation processes;

those arising in the production of technical-grade silicon by means of carbothermic reduction of $SiO_2$;

those arising in the course of mechanical processing and optionally of one or more classifying processes of technical-grade silicon. The mechanical processing may more particularly be crushing and/or grinding. Typical classifying processes are, for example, sieving and/or sifting;

those arising in the production of silanes. For example, the material in question here may be neutralized catalyst material from chlorosilane reactors before and/or after recovery of Cu;

more particularly from the processes of Müller-Rochow direct synthesis, hydrochlorination or low-temperature conversion for the production of silanes.

There is normally no need for these silicon residues to be purified before being used in the method of the invention; that is, the silicon-containing materials can be used without further purification steps.

In order to set defined values for characteristic number K in a targeted way, the silicon metal-containing material is preferably agglomerated, by pelletizing, briquetting and/or sintering, for example—and dried.

The mediator is preferably subjected to a process of comminution (e.g., grinding, crushing), classifying (e.g., sieving, sifting) and/or agglomeration (e.g., pelletizing, briquetting, sintering) in order to obtain the desired value for characteristic number K.

According to one preferred embodiment, the particle mixture of the particulate raw material mixture is selected such that the mean particle size of the silicon-containing material $d_{50,SiM}$ is greater than the mean particle size of the mediator $d_{50,Med}$.

According to another preferred embodiment, the particle raw material mixture has a water content of not more than 5% by mass, preferably not more than 1% by mass, more preferably not more than 1000 ppm by mass, and most preferably not more than 500 ppm by mass.

The particulate mediator preferably comprises the elements O, Si and Ca. The particulate mediator preferably comprises at least 10% by mass, more preferably at least 20% by mass, of O. The particulate mediator preferably comprises at least 5% by mass, more preferably comprises at least 10% by mass, of Ca. The particulate mediator preferably comprises at least 15% by mass, more preferably at least 20% by mass, of Si. The particulate mediator preferably comprises at least 1% by mass, more preferably at least 3% by mass, of Al.

The particulate mediator preferably comprises at most 1% by mass, more preferably at most 0.1% by mass, of halogen. The particulate mediator preferably comprises at most 0.05% by mass, more preferably at most 0.01% by mass, of F.

It may further be preferable for the particulate raw material mixture and/or the furnace charge to be doped with elements in a targeted way. This may be appropriate, for example, if the technical silicon being produced is intended for use in the synthesis of chlorosilanes. Doping in this context relates to one or more of the elements from the group made up of Al, Cu, Sn, Zn, O and P, or a compound or two or more compounds of these elements, or mixtures of these elements and compounds.

The energy input needed for the heating of the particulate raw material mixture may take place in any desired way. With preference the energy input takes place electrically. It may take place, for example, using induction technology or by resistance heating.

In one preferred embodiment, the furnace where the necessary energy input for liquefying the raw material mixture takes place electrically is an industrial furnace, more particularly a vertical furnace, such as an induction furnace, and more particularly a vacuum induction furnace.

The particulate raw material mixture is preferably heated to at least 1500° C., more preferably at least 1520° C.

The particulate raw material mixture is preferably held for at least 30 min, more preferably 1 h, at the temperature at which the liquid silicon metal phase is formed.

Density differences cause the silicon metal phase to separate from the remainder of the liquefied raw material mixture. On the basis of its lower density, the silicon metal phase collects on the surface of the liquefied raw material mixture.

After phase separation has taken place, the silicon metal is brought to solidification by cooling. This may take place on a cooled surface or in a cooled medium. In the former case, the solidified silicon metal is removed either mechanically from the cooled surface or by melting through heating of the cooled surface; in the latter case, the silicon metal is typically granulated, by atomizing technologies, for example. The equipment with the cooled surface or the cooled medium can be used many times.

The method may be carried out in ambient air, under inert gas, selected for example from nitrogen and argon, and also under reduced pressure. Furthermore, this method may be carried out in batch mode or in semibatch mode or else in fully continuous mode. The slag which remains may be left in the container as a mediator for a plurality of melting procedures, allowing further batches of new particulate, silicon metal-containing raw material mixtures to be introduced.

The particle size distribution may be determined according to ISO 13320 (laser diffraction) and/or ISO 13322 (image analysis). Mean particle sizes/diameters may be calculated from particle size distributions according to DIN ISO 9276-2. For mixtures of particulate substances having particle diameters of predominantly >0.1 mm, it is usual to carry out sieve analyses in order to characterize the particle mixture. The determination of the particle size distribution by sieve analysis takes place according to DIN 66165. A calculation of mean particle sizes/diameters from particle size distributions may take place according to DIN ISO 9276-2.

The overall porosity of a substance is made up of the sum total of the cavities which communicate with one another and with the environment (open porosity; identified here, in the present invention, as "porosity") and of the cavities which are not in communication with one another (closed porosity). The porosity measurements may take place according to the Archimedean principle and be carried out according to ASTM C373-88. The porosity of a material may additionally come from calculation from the absolute density and the apparent density. The absolute density and the apparent density may be determined by weight measurement and volume measurement using gas pycnometers. The determination of the density of solids is described in DIN 66137-2:2019-03.

Pyrometers may be used for the temperature in the method—quotient pyrometers are an example.

The chemical composition of the constituents of the particulate raw material mixture may be determined, for example, by means of x-ray fluorescence analysis, quantitative X-ray diffraction with an internal standard, and/or ICP-OES.

Examples

In a vacuum induction furnace, a high-purity graphite crucible was charged with 100 kg each of factors with different values for K, and these charges were heated to a temperature of around 1600° C. After the onset of phase separation, where a silicon surface developed, the operating temperature was maintained for 3 h at around 1550° C. Thereafter the silicon was decanted, poured into a casting trough, and solidified in ambient air. After the silicon has cooled to room temperature and been removed mechanically from the trough, the mass and the purity of the technical silicon obtained were determined. The method is economically viable from a mass of 20 kg and a purity of 80% by mass.

The chemical composition of the mediator used was as follows: C (0.11% by mass), O (26.5% by mass), Al (7.31% by mass), Ca (18.9% by mass), Si (46.7% by mass); the fraction of metallic silicon was around 36% by mass. The remainder, 0.48% by mass, was divided between Fe, Ti, Cu, Mg, P, B, V, Cr, Mn and Ni. The mass fraction of metallic silicon in the silicon metal-containing material in the dry state was around 49% by mass.

TABLE 1

| Trial | Characteristic number K | m (silicon) [kg] | Purity (silicon) [% by mass, Si] |
| --- | --- | --- | --- |
| 1 | 60 | 38 | 94 |
| 2 | 35 | 39 | 95 |
| 3 | 20 | 42 | 95 |
| 4 | 10 | 40 | 97 |
| 5 | 5 | 45 | 98 |
| 6 | 1 | 42 | 98 |
| 7 | 0.073 | 47 | 99 |
| 8 | 0.064 | 35 | 99 |
| 9 | 0.036 | 34 | 99 |
| 10 | 0.009 | 28 | 99 |

The examples demonstrate that the invention has provided an economic method which enables the production of silicon of technical grade (<99.9% by mass Si) starting from silicon-containing wastes and/or byproducts.

The invention claimed is:

1. A method for producing technical silicon, comprising:
heating a particulate raw material mixture comprising particulate silicon metal-containing material and a particulate mediator which comprises at least one of the elements C, O, Al, Ca and Si,
to at least 1490° C., forming a liquid silicon metal phase, and
solidifying the liquid silicon metal phase,
wherein the particulate raw material mixture is characterized by a characteristic number K,
K having a value of 0.000 to 60 mm and being calculated as follows:

$$K = \frac{m(SiM) \cdot d50(SiM) + m(Med) \cdot d50(Med)}{m(SiM) + m(Med)} \cdot \varphi \quad \text{(equation 1)}$$

where
m(SiM) is the mass of the silicon metal-containing material
m(Med) is the mass of the mediator in the raw material mixture
$d_{50,SiM}$ is the particle size (diameter) in mm at 50% of the mass undersize of the grading curve of the silicon metal-containing material,
$d_{50,Med}$ is the particle size (diameter) in mm at 50% of the mass undersize of the grading curve of the mediator, and
φ is the mean porosity of the silicon metal-containing material,
where the silicon-containing material is not subjected to further purification steps.

2. The method of claim 1, wherein the technical silicon produced has an Si content of at least 90% by mass.

3. The method of claim 1, wherein the particles of the silicon metal-containing material have an average particle size $d_{50,SiM}$ of 0.1 to 100 mm.

4. The method of claim 1, wherein the particles of the silicon metal-containing material have an average particle porosity of 0 to 0.6.

5. The method of claim 1, wherein the particles of the mediator have a mean particle size $d_{50,Med}$ of 0.1 to 100 mm.

6. The method of claim 1, wherein the mass ratio m of silicon metal-containing material/m of the mediator has a value of from 0.1 to 10.

7. The method of claim 1, wherein the silicon metal-containing material comprises silicon residues which are byproducts or wastes of silicon-producing or silicon-processing industries.

8. The method of claim 1, wherein the mean particle size of the silicon-containing material $d_{50,SiM}$ in the particulate raw material mixture is greater than the mean particle size of the mediator $d_{50,Med}$.

9. The method of claim 1, wherein the particulate mediator comprises the elements O, Si and Ca.

10. The method of claim 1, wherein the particles of the mediator have a mean particle size of from 2 to 50 mm.

11. The method of claim 1, wherein the particles of the mediator have a mean particle size of from 5 to 30 mm.

12. The method of claim 1, wherein the silicon metal-containing material in the dry state contains at least 30 weight percent of metallic silicon.

13. The method of claim 1, wherein the silicon metal-containing material in the dry state contains at least 40 weight percent of metallic silicon.

14. The method of claim 1, wherein the particles of the silicon metal-containing material have a mean particle porosity of 0.05 to 0.4.

15. The method of claim 1, wherein the particles of the silicon metal-containing material have a mean particle porosity of 0.1 to 0.35.

16. The method of claim 1, wherein the particles of the silicon metal-containing material have a mean particle size of from 0.5-75 mm.

17. The method of claim 1, wherein the particles of the silicon metal-containing material have a mean particle size of from 5-30 mm.

* * * * *